United States Patent
Chen et al.

(10) Patent No.: US 11,080,652 B2
(45) Date of Patent: Aug. 3, 2021

(54) METHOD AND SYSTEM FOR SUPPLY CHAIN MANAGEMENT

(71) Applicant: Flexport, Inc., San Francisco, CA (US)

(72) Inventors: Anthony Chen, San Francisco, CA (US); Sean Linehan, San Francisco, CA (US); Andrew Coyle, San Francisco, CA (US)

(73) Assignee: Flexport, Inc., San Francisco, CA (US)

( * ) Notice: Subject to any disclaimer, the term of this patent is extended or adjusted under 35 U.S.C. 154(b) by 453 days.

(21) Appl. No.: 15/803,626

(22) Filed: Nov. 3, 2017

(65) Prior Publication Data

US 2018/0121874 A1 May 3, 2018

Related U.S. Application Data

(60) Provisional application No. 62/417,222, filed on Nov. 3, 2016.

(51) Int. Cl.
G06Q 10/10 (2012.01)
G06Q 10/08 (2012.01)
G06Q 30/04 (2012.01)
G06Q 30/02 (2012.01)
G06Q 30/06 (2012.01)

(52) U.S. Cl.
CPC ...... *G06Q 10/0875* (2013.01); *G06Q 10/0832* (2013.01); *G06Q 10/10* (2013.01); *G06Q 30/0202* (2013.01); *G06Q 30/04* (2013.01); *G06Q 30/0635* (2013.01)

(58) Field of Classification Search
CPC .... G06Q 10/0875; G06Q 30/04; G06Q 10/10; G06Q 30/0202; G06Q 10/0832; G06Q 30/0635
USPC .......................................................... 705/29
See application file for complete search history.

(56) References Cited

U.S. PATENT DOCUMENTS

2007/0192213 A1* 8/2007 Wu ..................... G06Q 10/04
705/28

* cited by examiner

*Primary Examiner* — Russell S Glass
(74) *Attorney, Agent, or Firm* — Hickman Becker Bingham Ledesma LLP

(57) ABSTRACT

This disclosure pertains to systems and methods for managing supply chains. In one embodiment, the systems and methods disclosed herein comprise an automated system for maintaining an inventory of products. In one embodiment, the systems and methods disclosed herein optimize time and financial costs required for transporting mass via freight services.

23 Claims, 5 Drawing Sheets

Low Inventory Alert 301

Widget 302

Inventory Level: 10,000 units

Incoming: 1,000 units

Product Turnover: 10 days remaining

Lead Time: 10 days

Logistics Cost: from $0.20/unit

Logistics Time: from 2 days

View Logistics Options

FIG. 4

Inventory Alerts

HV2480 - Hoverstick G2

Est. Turnover: Aug 12, 2019

LOW

[Order Units]

---

Order Units                                                                                         ✕

PO #                     Product        Ready Date    ExFactory Date   Receiver    Units    Unit Cost   Subtotal

[Hoverstick G2 ▾]  [Undefined 📅]  [Undefined 📅]   [🔍 ABC Inc. ▾]  [1,000]  [$02.00 ✎]  $2,000.00 ✕

Vendor                   + Add Line

[- Select Vendor - ▾]  ⓘ

☑ Share with vendor

MABD                                                                                          Total $2,000.00

[Undefined 📅]

Memo - Optional

[                    ]                                                               [ Cancel ]   [ Create Order ]

FIG. 5

Logistics quotes based on order

| Value 501 | |
|---|---|
| $535.00 | 🚚 Shenzhen, China – Shanghai (SHA) — Trucking Partner Name |
| $2.00/kg – 2 - 3 Days | ✈ Shanghai (SHA) – San Francisco (SFO) — Air Partner Name |
| [Review 504] | 🚚 San Francisco (SFO) – Fort Bragg, CA, USA — Trucking Partner Name |

| Value 502 | |
|---|---|
| $561.75 | 🚚 Shenzhen, China – Shanghai (SHA) — Trucking Partner Name |
| $2.10/kg – 1 - 2 Days | ✈ Shanghai (SHA) – San Francisco (SFO) — Air Partner Name |
| [Review 505] | 🚚 San Francisco (SFO) – Fort Bragg, CA, USA — Trucking Partner Name |

| Value 503 | |
|---|---|
| $575.13 | 🚚 Shenzhen, China – Shanghai (SHA) — Trucking Partner Name |
| $2.15/kg – 1 - 2 Days | ✈ Shanghai (SHA) – San Francisco (SFO) — Air Partner Name |
| [Review 506] | 🚚 San Francisco (SFO) – Fort Bragg, CA, USA — Trucking Partner Name |

METHOD AND SYSTEM FOR SUPPLY CHAIN MANAGEMENT

CROSS REFERENCE TO RELATED APPLICATIONS

This application claims priority on the basis of U.S. Provisional Application No. 62/428,459 filed Nov. 30, 2016, U.S. Provisional Application No. 62/419,936 filed Nov. 9, 2016, U.S. Provisional Application No. 62/417,222 filed Nov. 3, 2016, U.S. Provisional Application No. 62/557,741 filed Sep. 12, 2017, U.S. Provisional Application No. 62/560,603 filed Sep. 19, 2017, and U.S. Provisional Application No. 62/555,593 filed Sep. 7, 2017, all of which are hereby incorporated by reference in their entirety.

TECHNICAL FIELD

This disclosure relates to methods and systems for supply chain management. In particular, this disclosure pertains to acquiring products for maintaining an inventory.

BACKGROUND

Supply and demand is one of the oldest principles of business. Keeping products on the shelf at a consistent rate is imperative for a successful company. Maintaining a stock of goods is a time consuming and complicated process.

Supply chain management is a difficult job for a logistician. Many factors affect the movement of goods, including the rate of manufacturing a product, shipping time, costs of supplies, fees, number of employees, etc. Keeping track of all these factors is an enormous task and can prove overwhelming for just one person. As a result, entire divisions of businesses are devoted to logistics for ensuring a constant stock of goods. However, even with the dedicated manpower, managing a supply chain is still difficult.

Most modern attempts to solve the problem of large scale supply chain management involves compressing data into a spreadsheet, which is manually maintained. However, supply chains often involve large rapidly changing streams of data, making spreadsheets outdated almost instantly. Also, the dedicated manpower to manually update spreadsheets is both time consuming and inefficient. Other methods involve segregating the information and managing each aspect separately, which not only hinders efficiency but leads to blind spots.

There exists a need for efficiently managing supply chains. There exists a need for dynamically moving mass from one location to another. In particular, there exists a need for coordinating the movement of multiple number of objects from multiple locations to a single location.

BRIEF DESCRIPTION OF THE DRAWINGS

FIG. 4 is an illustrative example of a graphical user interface for ordering a product.

FIG. 5 is an illustrative example of how Value 501, 502, and 503 with Review 504, 505, and 506 respectively are presented to a user with the methods and systems disclosed herein.

DETAILED DESCRIPTION

Figure 1:
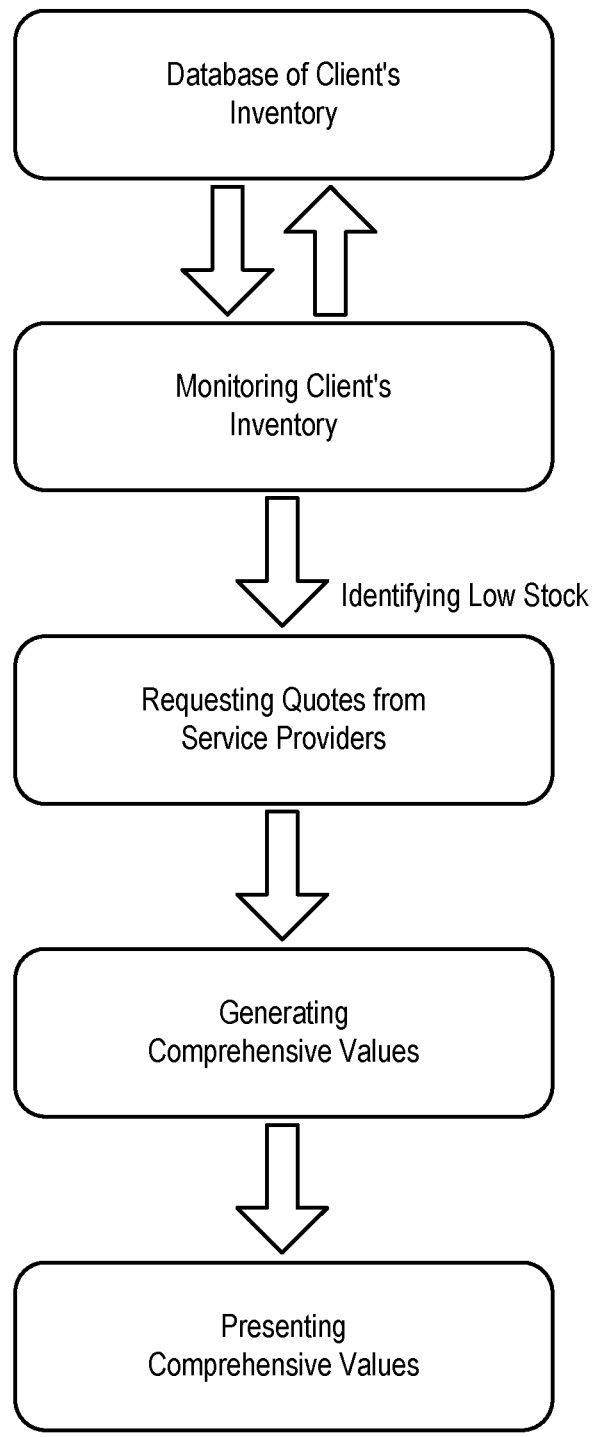
FIG. 1 is a flowchart showing one illustrative example of monitoring a supply chain with the methods and systems disclosed herein.

Disclosed herein are new methods and systems for efficiently managing one or more supply chains. In one embodiment, the methods and systems disclosed herein solve the problem of coordinating the movement of a number of objects from various locations to a single location. In one embodiment, replenishing a product is commissioned with a single action by a user and/or client. In one embodiment, restocking multiple products are commissioned with a single action by a user and/or client. In one embodiment, the methods and systems disclosed herein account for non-monetary factors for managing a supply chain. Examples of non-monetary factors include, but are not limited to, time of arrival, estimated time of manufacturing, customs clearance, federal regulatory compliance, e.g., complying with the Food and Drug Association, Fish and Wildlife, e.g., transportation method, client preferences, ecological impact, etc. In one embodiment, the methods and systems disclosed herein account for monetary factors for managing a supply chain. Examples of monetary factors include, but are not limited to, freight service fees, customs fees, legal fees, supply costs, product costs, etc.

In one embodiment, the methods and systems disclosed herein manage a supply chain automatically without input from a user and/or client, e.g., choosing and ordering supplies, selecting freight services, evaluating an inventory, etc. In one embodiment, the methods and systems disclosed herein manage a supply chain automatically without input from a user and/or client by analyzing historical data. In one embodiment, the methods and systems disclosed herein manage a supply chain semi-automatically with input from a user and/or client to operate within a parameter, e.g., choosing supplies and/or products within a price range, selecting only certain freight services, prioritizing a chosen factor over another, e.g., fastest time of arrival despite price, most cost-effective method, etc.

Disclosed herein are new methods and systems for moving supplies and/or products for managing and/or maintaining an inventory. In one embodiment, the methods and systems disclosed herein comprise utilizing a graphical user interface.

FIG. 4 is an illustrative example of a graphical user interface for ordering a product. FIG. 4 illustrates how the methods and systems disclosed herein consolidate acquiring a product in a single purchase order in an efficient manner without requiring a person manually processing large volumes of paperwork.

In one embodiment, the methods and systems disclosed herein aggregate information from multiple sources into a single platform, e.g., quotes from vendors, shipping dates, locations of supplies and/or products, number of units, etc. In one embodiment, the methods and systems disclosed herein aggregate information automatically, e.g., processing information without input from a user, curating information based on client's preferences, analyzing historical data, etc. In one embodiment, the methods and systems disclosed herein aggregate information semi-automatically, e.g., operating within a parameter chosen by a user, prompting a user for input, etc. In one embodiment, a graphical user interface comprises a Physical, Tangible Display Means, e.g., a computer, a mobile device, etc. In one embodiment, the Physical, Tangible Display Means comprises a comprehensive overview of a supply chain, e.g., presenting a timeline, providing a map, displaying the movement of mass from various geographic locations, logistics, etc.

Disclosed herein are new methods and systems for alerting a client about a low, or threshold, number of supplies and/or products in their inventory. In one embodiment, alerting a client comprises utilizing a sound, e.g., a beep, a ringtone, a buzzer, etc. In one embodiment, alerting a client comprises utilizing a visual message, e.g., a text message, a popup, an email, a fax, a color based system, etc. In one embodiment, alerting a client comprises a utilizing a tactical message, e.g., a vibration, a movement, etc. In one embodiment, alerting a client comprises a combination of a sound, visual message, and/or a tactile message.

In one embodiment, a user alerts a client with the methods and systems disclosed herein. In one embodiment, alerting a client comprises prompting an action from a client. In one embodiment, alerting a client comprises providing a recommendation to a client, e.g., choosing a supply from a new vendor, changing a freight service, ordering more products, etc. In one embodiment, alerting a client comprises requesting input from a user and/or client. In one embodiment, alerting a client comprises informing a client about an action, e.g., clearing customs, ordering a supply, approving a change in shipment, etc. In one embodiment, the methods and systems disclosed herein alert a client automatically, e.g., sending an alert without restrictions from a client, sending an alert without input from a user, etc. In one embodiment, the methods and systems disclosed herein alert a client semi-automatically, e.g., limiting the number of alerts, sending only a certain type of alert, etc.

Disclosed herein are new methods and systems for processing information for transporting supplies and/or products, e.g., quotes from a freight service provider, restrictions on movement of mass, opportunities for cost effective supplies and/or products, trends based on historical data, etc. In one embodiment, the methods and systems disclosed herein comprise moving supplies and/or products in a quick and efficient manner. In one embodiment, the methods and systems disclosed herein automatically gather the raw materials for making and/or attaining a product. In one embodiment, the methods and systems disclosed herein comprise moving mass at particular times, e.g., moving mass before reaching a product's threshold limit, ordering products in anticipation of sales trends, etc.

In one embodiment, the methods and systems disclosed herein coordinate the movement of supplies and/or products. In one embodiment, the methods and systems disclosed herein facilitate the movement of mass without requiring or requesting input from a user, i.e., the methods and systems disclosed herein automatically move mass. In one embodiment, the methods and systems disclosed herein prompt a user and/or client for information, e.g., preferences for a supply and/or product, preferred method of shipment, establishing a threshold limit, etc. In one embodiment, a user and/or client inputs information and the methods and systems disclosed herein make decisions based on the given information.

Disclosed herein is a method for automating supply chain resources, comprising:
   accessing a client's inventory;
   monitoring a product for maintaining the client's inventory;
   determining the product's turnover;
   analyzing freight services for acquiring the product;
   calculating a comprehensive value; and
   presenting the comprehensive value.

FIG. 1 is an illustrative example of how the methods and systems disclosed herein facilitate the movement of mass. FIG. 1 illustrates how the methods and systems monitor the client's database in real-time for maintaining an inventory automatically.

As used herein, the term "user" refers to an entity practicing the methods or using the systems as disclosed herein. Within the context of this disclosure, the term "user" includes a person interacting with software, for example a service provider managing a client's inventory utilizing a computer. In one embodiment, the user accesses a client's information, e.g., the number of products within an inventory, a registry of where products are located, the different types of products within an inventory, etc. In one embodiment, the user assists in efficiently managing a supply chain for keeping products in the stream of commerce, e.g., maintaining the number of products in an inventory, tracking the movement of mass, ensuring quality compliance, prompting a client for input, etc. In one embodiment, the methods and systems disclosed herein operate independent of a user. In one embodiment, the methods and systems disclosed herein make decisions based on the input of a user, e.g., selecting services within a price range, requesting quotes from specific freight services, monitoring only specific supplies and/or products, etc.

As used herein, the term "client" refers to an entity possessing and/or owning a Physical, Concrete and Tangible Object. In one embodiment, the client is a product manufacturer, e.g., an entity responsible for making a product, e.g., a food product, an electronic device, a piece of furniture, etc. In one embodiment, the client is a retailer selling a product, e.g., a food product, an electronic device, a piece of furniture, etc. In one embodiment, the client requires a particular number of products to sell, e.g., a number of electronic devices, textiles, books, etc., at any given time, e.g., a particular time of the year, particular intervals of time, a preset time period, etc. In one embodiment, the client requires a particular level of supplies to create the products, e.g., wires for making electronic devices, cloth for making clothes, sugar for making food items, etc. In one embodiment, the client requires a supply chain to maintain a particular number of products in their possession.

In one embodiment, the supply chain involves a plurality of separate entities. In one embodiment, the separate entities form a network of logistics for acquiring a supply, product, and/or service from and/or for a business. In one embodiment, a client requires legal services for moving mass from one location to another. In one embodiment, a client requires a freight service for moving mass from one location to another. In one embodiment, the client interacts with a user operating the systems and/or methods disclosed herein. In one embodiment, the user assists the client by operating the systems and/or using the methods disclosed herein for rapid and efficient supply chain management.

As used herein, the term "inventory" refers to a number of Physical, Concrete and Tangible Objects a client possesses and/or controls. In one embodiment, the inventory comprises subcategories of Physical, Concrete and Tangible Objects, e.g., a range of products, products from a specific manufacturer, supplies from a specific origin, a particular type of product, etc. In one embodiment, the items within the inventory are located or destined for a single geographic location, e.g., a warehouse, a distribution center, a retail store, etc. In one embodiment, the items within the inventory are distributed across several locations, e.g., warehouses, trucks, ports, retail stores, etc.

In one embodiment, the methods and systems disclosed herein track the number of items within a client's inventory, e.g., counting the number of items within a client's inventory, determining the number of products in a given category, determining the number of products of a particular type, determining the number of products from a specific source, etc. In one embodiment, the methods and systems disclosed herein automatically track the number of supplies and/or products within an inventory, e.g., using a Cloud database to share information between a client and a user, a user using an application program interface to access a client's database for attaining information about retail sales, etc. In one embodiment, the methods and systems disclosed herein maintain a set number of supplies and/or products within an inventory, e.g., by acquiring products for retail sales, manufacturing products, replenishing supplies, etc.

As used herein, the term "accessing a client's inventory" refers to retrieving information regarding the current number of a Physical, Concrete and Tangible Object a client possesses and/or controls. In one embodiment, accessing a client's inventory comprises obtaining the number of Physical, Concrete and Tangible Objects the client controls, e.g., a product on the shelf of a third-party seller, a product located in a warehouse, a supply stored at a factory, etc.

In one embodiment, accessing a client's inventory comprises a user determining the number of Physical, Concrete and Tangible Objects the client possesses, e.g., analyzing a client's sales records, reviewing a client's shipping itinerary, determining the number of products within a warehouse, etc. In one embodiment, a user counts (directly or indirectly) the number of Physical, Concrete and Tangible Objects the client has in their physical possession. In one embodiment, the user determines the number of Physical, Concrete and Tangible Objects the user has in their control but not physical possession, e.g., the number of Physical, Concrete and Tangible Objects in transit, e.g., a product on a truck, a product at a third-party retailer, a supply stored at a factory, etc. In one embodiment, accessing a client's inventory comprises processing information related to the location and movement of mass, e.g., estimated time of arrival of mass, the number of supplies and/or products within an inventory, historical trends of sales, etc. In one embodiment, the methods and systems disclosed herein automatically access a client's inventory, e.g., using a Cloud database to share information between a client and a user, a user using an application program interface to access a client's database for attaining information about retail sales, etc. In one embodiment, the methods and systems disclosed herein semi-automatically access a client's inventory, e.g., prompting a client to manually input information, accessing a database on a routine schedule (daily, weekly, monthly, etc.), etc.

In one embodiment, a user and/or client utilizes the methods and systems disclosed herein to establish a threshold limit for one or more products and/or supplies.

Within the context of this disclosure, the term "threshold limit" refers to a parameter for beginning the replenishing process for a particular supply and/or product. In one embodiment, the client sets the threshold limit. In one embodiment, a user sets a threshold limit. In one embodiment, the threshold limit is permanent. In one embodiment, the threshold limit is temporary. In one embodiment, the threshold limit changes periodically.

In one embodiment, the methods and systems disclosed herein recommends a threshold limit to a client and/or user. In one embodiment, the methods and systems disclosed herein recommends a threshold limit to a client based on the historical data of a product, e.g., the number of sales during a specific time of the year, historical trends of decreased and increased sales, etc. In one embodiment, the systems and methods disclosed herein alert a client of when an inventory falls below a threshold limit. In one embodiment, the threshold limit is time dependent, e.g., having to replenish a product within a certain time period before the inventory is depleted.

As used herein, the term "supply" refers to an item or items required for manufacturing, making, getting, possessing, controlling, and/or receiving a product. In one embodiment, the supply is assembled into a product during the manufacturing process, e.g., cloth used for making a shirt, wires for making an electronic device, paper using for making a book, etc. In one embodiment, some or all of the supply is used for manufacturing a product but not incorporated into the product itself, e.g., a tool for making a device, a machine for manufacturing, fuel for vehicles, etc.

As used herein, the term "product" refers to a Physical, Concrete and Tangible Object within a client's inventory. In one embodiment, the product is controlled by a client and sold to another, e.g., an electronic device, a food item, a car, etc. In one embodiment, a particular product is within a client's inventory. In one embodiment, a product is used to create another product. In one embodiment, the methods and systems disclosed herein move supplies from one location to another to create a product. In one embodiment, a supply may also be a product, e.g., a client uses a raw material to make a product and also sells the raw material, a client uses wires to make an electronic device and also sells the wires. In one embodiment, the methods and systems disclosed herein move products from one location to another, e.g., moving a pallet of mobile phones from Shanghai to Los Angeles, a less than container load of shirts from Taiwan to New York, etc.

As used herein, the term "maintaining the client's inventory" refers to adjusting the number of supplies and/or products within a client's inventory to meet a parameter. In one embodiment, the parameter is a threshold limit. In one embodiment, the parameter is a set number of units within an inventory, e.g., 1,000 computers, 500 shirts, etc. In one embodiment, the methods and systems disclosed herein automatically add more products to a client's inventory, e.g., purchasing products, drafting a purchase order, searching for a supply, etc. In one embodiment, the methods and systems disclosed herein automatically coordinate the movement of mass for maintaining a client's inventory. In one embodiment, maintaining the client's inventory comprises ensuring a product never falls below a threshold limit. In one embodiment, maintaining the client's inventory comprises reaching a supply and/or product before a product falls below a threshold limit. In one embodiment, maintaining the client's inventory comprises predicting when a client should purchase a supply and/or product, e.g., using historical data of a supply chain, e.g., sales volume, order history, trends, competitor prices, etc., to avoid a zero number of products.

In one embodiment, the methods and systems disclosed herein alert a client of missing and/or needed parts and/or pieces for manufacturing a product. In one embodiment, the methods and systems disclosed herein alert a client of an issue delaying the movement of mass, e.g., a delay in shipment, a vendor not having enough supplies, a product damaged during shipment, a product lost during shipment, etc.

Figure 3:
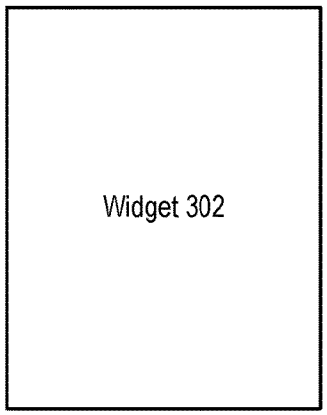
FIG. 3 is an illustrative example of monitoring a supply chain for Widget 302 with Low Inventory Alert 301.

As used herein, the term "monitoring supplies" refers to periodically determining and evaluating the amount of supplies the client possesses and/or controls. Within the context of this disclosure, "periodically" means monitoring supplies at time intervals less than the time it takes to sell all of the inventory. In one embodiment, a user determines the time intervals e.g., monitoring supplies daily, monitoring supplies monthly, monitoring supplies based on number of sales, etc. In one embodiment, the methods and systems disclosed herein recommend, e.g., via a message presented on a Physical, Tangible Display Means, a time interval for avoiding the shortage of a product. In one embodiment, the methods and systems disclosed herein automatically monitor supplies and/or products, e.g., utilizing a Cloud database for sharing information, utilizing an application interface program to transfer information, etc. In one embodiment, monitoring supplies creates data used to predict future trends, e.g., periods of increased or decreased supply use, seasonal supply sales, etc. In one embodiment, periodically is the close of business each day of the week. In one embodiment, periodically is once per week. In one embodiment, periodically is the first of every month. In one embodiment, periodically is real time. FIG. 3 is an illustrative example of monitoring a supply chain for Widget 302 with Low Inventory Alert 301.

As used herein, the term "real time" refers to an event occurring contemporaneously, e.g., an event presently occurring in the natural world or a current up to date state or condition. Within the context of this disclosure, term "real time" is understood to not mean the exact time an event occurs, e.g., the delay in time for recording the occurrence of an event to a computer, the delay in time when witnessing an event and registering the event, etc. In one embodiment, monitoring supplies in real time provides an opportunity for avoiding an empty inventory by replenishing an inventory before a product's number reaches zero. This is an advantage over other technology in which there is often a lag between an estimated number of supplies and/or products and the actual current number supplies and/or products.

In one embodiment, a client's inventory comprises both supplies and products. In one embodiment, a client's inventory comprises both supplies and products located and/or stored in a single geographical location. In one embodiment, a client's inventory comprises both supplies and products distributed across two or more geographical locations. In one embodiment, the methods and systems disclosed herein automatically track the number of supplies and/or products, e.g., using a Cloud database to share information between a client and a user, a user using an application program interface to access a client's database for attaining information about retail sales, etc.

In one embodiment, the methods and systems disclosed herein automatically acquire the supplies and/or products for a client, e.g., coordinating and facilitating the movement of mass, monitoring supply levels, reviewing quotes for potential savings, reviewing historical data for trends, reviewing competitor sales, etc.

As used herein, the term "turnover" refers to a rate at which a supply and/or product is depleted over a period of time. In one embodiment, the turnover is measured in seconds. In one embodiment, the turnover is measured in minutes. In one embodiment, the turnover is measured in hours. In one embodiment, the turnover is measured in days. In one embodiment, the turnover is measured in weeks. In one embodiment, the turnover is measured in months. In one embodiment, the turnover is measured in quarters of the year. In one embodiment, the turnover is measured in years. In one embodiment, the turnover is measured in real time.

In some embodiments, a turnover rate is used for predicting future trends and/or sales based on comparisons of historical data. In one example, a turnover rate is used for predicting when the restocking process should begin to avoid a product falling below a threshold limit. In one embodiment, the methods and systems disclosed herein automatically calculate a product's turnover. In one embodiment, a user calculates the turnover rate. In one embodiment, a user controls the time when a product's turnover is calculated (e.g., daily, weekly, monthly, yearly, etc.).

As used herein, the term "determining the product's turnover" refers to calculating the turnover rate for a particular product and/or supply. In one embodiment, determining the product's turnover comprises predicting when the number of products falls below a particular parameter, e.g., when a product falls below a threshold limit, when a product's turnover is greater than the amount needed for a particular time period (e.g., based on the amount present in an inventory), etc. In one embodiment, determining the product's turnover comprises when a product is returned to an inventory. In one embodiment, determining the product's turnover comprises when a product is damaged and is not counted as a sale but is not returned to an inventory. In one embodiment, determining the product's turnover is calculated on a daily basis. In one embodiment, determining the product's turnover is calculated on a weekly basis. In one embodiment, determining the product's turnover is calculated on a monthly basis. In one embodiment, determining the product's turnover is calculated on a yearly basis. In one embodiment, determining the product's turnover is calculated in real time. In one embodiment, determining the product's turnover comprises predicting trends, e.g., future sales, future conditions, impact of competitor's prices, etc., based on comparisons to historical data accomplished through analytics. In one embodiment, the methods and systems disclosed herein automatically calculate the product's turnover. In one embodiment, a user calculates (directly or indirectly) a product's turnover.

In one embodiment, the methods and systems disclosed herein comprise generating a list of supplies.

As used herein, the term "generating a list of supplies" refers to determining the quantity of supplies and/or products needed for manufacturing and/or maintaining a particular number of supplies and/or products within an inventory. In one embodiment, the methods and systems disclosed herein automatically generate a list of supplies. In one embodiment, the methods and systems disclosed herein present the list of supplies on a Physical, Tangible Display Means.

In one embodiment, the methods and systems disclosed herein automatically track the number of supplies and/or products within a client's inventory, e.g., utilizing a Cloud database to share information, transferring information with an application interface program, etc. In one embodiment, the methods and systems disclosed herein account for a client's preference, e.g., a supply from a particular source, price for a supply, quality of a supply, quantity of products, etc. In one example, the methods and systems disclosed herein prompt a user for a preference. In one example, the client inputs a preference for the most cost-effective method for moving a supply from one location to another into the methods and systems disclosed herein. In one embodiment, a client provides a list of supplies. In one embodiment, a client modifies a generated list of supplies, e.g., utilizing the methods and systems disclosed herein to change the number of units, the transportation method, the arrival date, etc. In one embodiment, generating a list of supplies comprises calculating a recommended number of supplies a client should purchase. In one embodiment, generating a list of supplies comprises determining when the supplies should be purchased in order to avoid an inventory falling below a threshold limit. In one embodiment, generating a list of supplies comprises presenting a client with a list of supplies and a prediction of when the current number of supplies will reach a threshold limit.

As used herein, the term "freight service" refers to an entity transporting mass, such as moving supplies and/or products. Within the context of this disclosure, a "freight service" includes any entity moving mass involving water, air, ground, or any combination thereof. In one embodiment, the freight service comprises a ship. In one embodiment, the freight service comprises a truck. In one embodiment, the freight service comprises an airplane. In one embodiment, the freight service comprises a train. In one embodiment, the freight service comprises a truck and an airplane working in conjunction to move mass.

In one embodiment, the methods and systems disclosed herein determines the fastest freight service for moving a supply and/or product to a client's desired location. In one embodiment, the methods and systems disclosed herein determines the highest rated freight service for moving mass. In one embodiment, the methods and systems disclosed herein provide a recommendation for moving mass. In one embodiment, the methods and systems disclosed herein provide a recommendation for moving mass based on a client's preference, e.g., fastest method of movement, most cost-effective method, quality of service, history of completion of service, etc. In one embodiment, the methods and systems disclosed herein provide multiple recommendations. In one embodiment, the methods and systems disclosed herein provide recommendations by analyzing historical data of previous shipments of mass, e.g., number of products ordered in a time period, the routes traveled, the type of service used, etc.

As used herein, the term "analyzing a freight service for acquiring the product" refers to assessing which freight service or freight services would be best for moving supplies and/or products from one location to another. In one embodiment, analyzing a freight service for acquiring the product is performed automatically, e.g., using a Cloud database to share information between a client and a user, a user using an application program interface to access a client's database for attaining information about retail sales, etc.

A number of factors determines which freight services is the best preferred freight service, e.g., the location of the supplies, the time for delivery, method of delivery, cost, goodwill of freight service, client's preference, etc. In one embodiment, analyzing a freight service for acquiring the product comprises analyzing historical data to determine the best freight service or freight services, e.g., time of arrival, need of a product, etc. In one embodiment, analyzing a freight service for acquiring a supply and/or product comprises evaluating a monetary value for moving mass, e.g., the cost of service, the cost of a supply and/or product, regulatory fees, fueling costs, etc. In one embodiment, analyzing a freight service for acquiring a supply and/or product comprises evaluating a non-monetary value, e.g., time of arrival, quality of service, client's preference, quality of a supply and/or product, history of a freight service fulfilling shipment, ecological impact (e.g., carbon dioxide emissions), etc.

In one embodiment, the methods and systems disclosed herein comprise automatically coordinating the movement of multiple supplies and/or products to a single location. In one embodiment, the methods and systems disclosed herein automatically coordinate the movement of multiple supplies and/or products to multiple locations. In one embodiment, the methods and systems disclosed herein account for a number of logistical factors, e.g., customs clearance, requirement of legal services, time for manufacturing, labor costs, etc.

As used herein, the term "vendor" refers to a seller of a good and/or a service. In one embodiment, the vendor has a previous business relationship with the client. In one embodiment, the vendor is a new entity. In one embodiment, the vendor is a lawyer performing legal services. In one embodiment, the vendor is a seller of supplies. In one embodiment, the vendor is a seller of products. In one embodiment, the methods and systems disclosed herein procures a service, supply, and/or product from a vendor. In one example, a user of the methods and systems disclosed herein purchase a service, supply, and/or product on behalf of the client from a vendor. In one embodiment, the methods and systems disclosed herein record purchases from vendors. In one embodiment, the methods and systems disclosed herein recommend vendors of comparable quality.

In one embodiment, the methods and systems disclosed herein comprise requesting quotes from vendors.

As used herein, the term "requesting quotes from vendors" refers to receiving a monetary value for a service, supply, and/or product needed for acquiring a product from two or more vendors. In one embodiment, the methods and systems disclosed herein automatically request quotes from vendors, e.g., continuously soliciting and receiving quotes from vendors, processing quotes for recommendation, filtering quotes based on a client's preference, etc. In one embodiment, requesting quotes from vendors comprises receiving in an email. In one embodiment, requesting quotes from vendors comprises receiving in a phone call. In one embodiment, requesting quotes from vendors comprises receiving in a fax. In one embodiment, requesting quotes from vendors comprises utilizing a Cloud database for sharing information. In one embodiment, a user solicits quotes manually, e.g., contacting a vendor via phone, email, fax, etc. In one embodiment, quotes are standing rates, which are offers acceptable for a set period of time, a set number of goods, and/or a set number of services. In one embodiment, quotes are a one-time offer. In one embodiment, requesting quotes from vendors comprises receiving quotes from new vendors. In one embodiment, requesting quotes from vendors comprises receiving quotes from old vendors offering new prices. In one embodiment, requesting quotes from vendors comprises considering a client's preference, e.g., cost limits, quality of service, supply and/or product origin, a particular type of a supply and/or product, etc. In one embodiment, requesting quotes from vendors comprises filtering quotes relevant to a client's needs and/or preferences.

As used herein, the term "comprehensive value" means a total amount required for acquiring a particular supply and/or product. In one embodiment, the comprehensive value comprises a monetary value, e.g., cost of the supply, cost of service, regulatory fees, legal services, fueling costs, etc. In one embodiment, the comprehensive value comprises a non-monetary value, e.g., reputational value, goodwill of service, quality of a supply and/or product, ecological impact, estimated time of arrival, etc.

In one embodiment, the methods and systems disclosed herein prompt a user and/or client for a preference. In one embodiment, the comprehensive value is calculated giving deference to a client's preference, e.g., measuring the fastest time of arrival with the cost of a freight service, the quality of a supply and/or product versus the price of said supply and/or product, quality of service versus the time of arrival, etc. In one embodiment, the comprehensive value comprises a recommendation based on a client's preferences and historical data to present comparable and/or more cost-effective alternatives. In one embodiment, the comprehensive value comprises a recommendation based on historical data of an inventory, e.g., total sales, trends, estimated growth, etc. In one embodiment, the comprehensive value comprises the total cost of transportation. In one embodiment, the comprehensive value comprises a reputational value, e.g., reviews, ratings, and/or goodwill. In one embodiment, the comprehensive value comprises legal services. In one embodiment, a user calculates the comprehensive value. In one embodiment, the methods and systems disclosed herein automatically calculate the comprehensive value.

While a monetary value would normally suffice for determining costs, clients often rely on other non-monetary factors for selecting services that the previous shipping and transit technologies fail to consider. In one example, the non-monetary factor is a reputational value, e.g., reviews, ratings, and/or goodwill of a service. In the example of goodwill, the name and value of a certain vendor lends credibility, which may offset a higher cost for a comparable service from a less reputable vendor. As such, the methods and systems disclosed herein adjust the comprehensive value to reflect the client's preference.

In one embodiment, the methods and systems disclosed herein use historical data to flag potential issues with a service. In one example, the methods and systems disclosed herein warn a user of a freight service with a repeated history of delayed shipments. In one embodiment, methods and systems disclosed herein assign a numerical value to a non-monetary factor, e.g., a ranking system, a quality rating, etc.

As used herein, the term "calculating a comprehensive value" refers to determining the comprehensive value for acquiring a particular supply and/or product. In one embodiment, the methods and systems disclosed herein automatically calculate the comprehensive value. In one embodiment, calculating a comprehensive value comprises comparing the client's preferences with the available vendors, e.g., selecting a supply within a client's price range, determining whether a client's preferred freight service can move a product, comparing the quality of a product with a client's price range, etc. In one embodiment, calculating a comprehensive value comprises a cost benefit analysis, e.g., the fastest time a product can arrive at a client's location within a price range, the quality of a freight service versus the price associated with said freight service, recommended procedures to ensure federal compliance, time frame of ordering to ensure timely delivery, etc. In one embodiment, a user (directly or indirectly) calculates the comprehensive value.

As used herein, the term "presenting the comprehensive value" refers to providing, showing, illustrating, and/or demonstrating a concrete representation of a comprehensive value. In one embodiment, presenting the comprehensive value comprises a Physical, Tangible Display Means. In one embodiment, the Physical, Tangible Display Means comprises a screen, e.g., a computer, mobile device, etc. In one embodiment, presenting the comprehensive value comprises alerting the client about the need to restock the products and the costs needed, e.g., a text message, an audio cue, a color based system, etc. In one embodiment, presenting the comprehensive value comprises displaying a timeline, e.g., arrival time of supplies and/or products at a chosen location, when milestone events will occur (clearing customs, loading and unloading dates, etc.), a map of a route for moving a supply and/or product, etc. In one embodiment, a user selects a comprehensive value. In one embodiment, presenting the comprehensive value comprises selecting a purchase order. In one embodiment, presenting a comprehensive value is performed automatically, e.g., presenting an alert on a graphical user interface, sending an alert to a mobile device, a user sending an email to a client, etc.

In one embodiment, multiple comprehensive values are presented. In one embodiment, multiple comprehensive values are calculated based on historical data for opportunities for a more efficient supply chain. In one embodiment, multiple comprehensive values are calculated automatically. In one example, a new cost-effective method of ordering and moving a supply was used to calculate a comprehensive value. In one example, new route was used to calculate a comprehensive value. In one embodiment, multiple comprehensive values are presented on a graphical user interface. In one embodiment, a graphical user interface serves as a way for a user to manage supply chains by evaluating all possible options in a systematic and efficient manner. Instead of having to compile different spreadsheets and manually process the quotes, a user can view a supply chain in a holistic manner that was otherwise not available with previous technology. This allows for easier comprehension of the data by a user that is cost and time efficient.

FIG. 5 is an illustrative example of how Value 501, 502, and 503 with Review 504, 505, and 506 respectively are presented to a user with the methods and systems disclosed herein. Value 501, 502, and 503 each present different options for pricing and time of arrival of a product. A user can easily discern the method of transportation and the route. The user can also view each value in more detail with Review 504, 505, and 506.

In one embodiment, the methods disclosed herein comprise analyzing pending purchase orders.

As used herein, the term "analyzing pending purchase orders" refers to determining when a supply and/or product will physically leave a client's inventory. In one embodiment, analyzing pending purchase orders comprises determining when a client relinquishes physical possession of a product, e.g., when a client sells a product but maintains possession for a period of time, a disputed purchase in which a client may regain possession of a product, etc. In one embodiment, analyzing pending purchase orders signifies an opportunity for the methods and systems disclosed herein to make a recommendation. In one example, in the case of a high volume of purchase orders, the methods and systems disclosed herein recommends a client to order more supplies and/or products than normally anticipated. In one example, in the case of a lower volume of purchase orders, the methods and systems disclosed herein recommends a client to either delay shipment of an order or order less supplies and/or products. In one embodiment, analyzing pending purchase orders is accomplished automatically, e.g., utilizing a Cloud database to share information, transferring information with an application interface program, etc. In one embodiment, the methods and systems disclosed herein prompt a user and/or client to input pending purchase orders.

In one embodiment, the methods and systems disclosed herein comprise analyzing a product's sales velocity.

As used herein, the term "analyzing a product's sales velocity" refers to observing the rate at which a supply and/or product is leaving a client's physical possession. In one embodiment, analyzing a product's sales velocity comprises calculating the turnover rate. In one embodiment, analyzing a product's sales velocity comprises determining the future rate of sales, e.g., analyzing historical data through analytics. In one embodiment, analyzing a product's sales velocity comprises accounting for transportation costs. In one embodiment, analyzing a product's sales velocity comprises analyzing sales during a shopping season with historical data of previous sales. In one embodiment, analyzing a product's sales velocity comprises determining market availability by analyzing competitor's presence, historical data, social media presence, etc. In one embodiment, analyzing a product's sales velocity comprises analyzing competitor prices. In one embodiment, analyzing a product's sales velocity indicates a need to replenish an inventory. In one example, when a particular product is selling at a faster rate than previously observed, the methods and systems disclosed herein alert a client that he or she needs to acquire the particular product sooner than normally expected. In one embodiment, analyzing a product's sales velocity allows the methods and systems disclosed herein to make recommendations to a client and/or user based on comparisons of historical data. In one example, a particular supply is used in higher volumes than previously observed and purchasing the particular supply in larger quantities provides a more cost-effective supply chain.

In one embodiment, the methods and systems disclosed herein comprise a graphical user interface. In one embodiment, the graphical user interface comprises complex filtering. In one embodiment, the graphical user interface comprises simulating a shipment. In one embodiment, the graphical user interface comprises selecting an action. In one embodiment, the graphical user interface comprises a Physical, Tangible Display Means. In one embodiment, the Physical, Tangible Display Means comprises a screen, e.g., a computer, a mobile device, etc.

As used herein, the term "complex filtering" refers to dividing and/or processing a shipment or multiple shipments into individual categories. In one embodiment, complex filtering comprises presenting the logistics of a shipment to a user and/or a client, e.g., date of arrival, cost, number of units, etc. In one embodiment, complex filtering provides a user and/or a client the ability to view a supply chain on all levels of procurement. In one example, a user can view the freight service options available. In one example, a user can view the various dates for the arrival of a supply and/or product.

As used herein, the term "category" refers to a distinct aspect of a larger entity. In one embodiment, a user selects a category of a comprehensive value, e.g., freight service, type of product, departure date, arrival date, fees, cost, etc. In one embodiment, the category is a freight service. In one embodiment, selecting the freight service category provides the user an aggregate of the possible freight services possible for moving the mass.

As used herein, the term "simulating a shipment" refers to a creating a concrete visual presentation of a movement of mass. In one embodiment, the client receives multiple comprehensive values for the same product. Using the methods and systems disclosed herein, the client selects a comprehensive value and a simulation of the movement of the supplies and/or products is presented, e.g., presenting a timeline of the movement of mass, projecting arrival times, displaying prices, etc. In one embodiment, a user utilizes the simulation of a shipment to compare two or more comprehensive values. In one embodiment, a user manipulates a simulation of a shipment to create a new route for the movement of mass. In one embodiment, simulating a shipment comprises presenting a graph. In one embodiment, simulating a shipment comprises presenting picture illustrations, symbols, words, numbers, and/or colors. In one embodiment, simulating a shipment comprises presenting a timeline. In one embodiment, simulating a shipment comprises presenting a comprehensive value.

As used herein, the term "selecting an action" refers to choosing an option from one or more possibilities. In one embodiment, selecting an action comprises selecting a freight service for the movement of a supply and/or product. In one embodiment, the methods and systems disclosed herein automatically provide a recommendation of an action, e.g., selecting a supply based on a special offer, decreasing the number of products normally ordered, choosing a specific freight service, etc. In one embodiment, the methods and systems disclosed herein prompt a client for an action, e.g., the selection of a comparable supply than originally requested, the cancellation of an order because of a price change, the acceptance of a delayed shipment, etc. In one embodiment, the methods and systems disclosed herein automatically choose an action, e.g., the selection of a specific freight service for future shipments, the decision to not use a particular product, always determining the fastest shipping method, etc.

In one embodiment, the methods and systems disclosed herein comprise requesting multiple quotes.

As used herein, the term "requesting multiple quotes" refers to soliciting and/or asking for quotes from two or more vendors. In one embodiment, requesting multiple quotes allows for comparing different price options for supplies, products, and/or services. In one embodiment, the methods and systems disclosed herein automatically request multiple quotes. In one embodiment, the methods and systems disclosed herein select and create the best shipment options from multiple quotes. In one embodiment, requesting multiple quotes comprises receiving quotes from multiple vendors for services, supplies, and/or products of comparable quality. In one embodiment, the methods and systems disclosed herein selectively request quotes based on a client's preference. In one embodiment, the methods and systems disclosed herein selectively request quotes based on historical data of previous purchase orders.

In one embodiment, presenting the comprehensive value comprises determining an individual cost.

As used herein, the term "determining an individual cost" refers to calculating a cost for a particular transaction used in calculating a comprehensive value. In one embodiment, an individual cost is the price for a supply and/or product. In one embodiment, an individual cost is a fee, e.g., a customs fee, a legal service fee, a freight service fee, etc. In one embodiment, a user operates the systems and/or uses the methods disclosed herein to determine an individual cost. In one embodiment, the methods and systems disclosed herein automatically determine an individual cost. In one embodiment, determining an individual cost comprises selecting a quote from a vendor for a service, supply and/or product. In one embodiment, determining an individual cost comprises calculating all the individual costs for calculating a comprehensive value.

In one embodiment, the methods and systems disclosed herein comprise evaluating a date for a shipment of a product.

As used herein, the term "evaluating a date for a shipment of a product" refers to determining the time when a supply and/or product will arrive at a client's chosen location. In one embodiment, different vendors offer comparable shipping dates. Accordingly, if multiple vendors are considered, then there is a plurality of dates upon which the supplies and/or products will arrive at a chosen location. In one embodiment, evaluating a date for a shipment of a product comprises comparing different dates for the arrival of a supply and/or product. In one embodiment, the methods and systems disclosed herein prompt a user for a preference. In one embodiment, evaluating a date for a shipment of a product comprises analyzing a date based on a client's preference, e.g., fastest arrival date, cost, quality of freight service, preference of transportation method, etc. In one embodiment, evaluating a date for a shipment of a product comprises determining a turnover rate of the product, e.g., to avoid an inventory falling below a threshold limit. In one embodiment, the methods and systems disclosed herein automatically evaluate the date of a shipment of a product. In one embodiment, the methods and systems disclosed herein recommend a date based on historical data of shipments.

In one embodiment, the methods disclosed herein comprise a single transaction.

As used herein, the term "single transaction" refers to a purchase of a comprehensive value. In one embodiment, a single transaction pays for all the services, supplies, and/or products needed for obtaining a particular product, e.g., a single confirmation, a single click, etc. In one embodiment, a single transaction provides a client with a faster and more efficient manner of maintaining an inventory. A single transaction provides a significant advantage over the technology available of contacting various individual vendors for the purchase of services for facilitating the movement of mass. In one embodiment, the purchase of a single transaction initiates the process of moving a supply and/or product from one location to another. In one embodiment, a single transaction allows a user to create a payment schedule, e.g., purchasing a supply, purchasing a freight service, paying fees at appropriate times, etc. In one embodiment, a single transaction is a lump sum payment for all services for moving a mass from one location to another. In one embodiment, a single transaction is automatic feature chosen by a client and/or user, i.e., a client and/or user does not need to approve every single transaction, e.g., by providing billing information.

Disclosed herein is a supply chain management system, comprising:
an inventory comprising a product;
a collection of quotes; wherein a comprehensive value is calculated; and
an automated alert mechanism.

As used herein, the term "inventory comprising a product" refers to a physical collection of a supply and/or product. In one embodiment, the inventory comprising a supply and/or product is located at a single geographic location. In one embodiment, the inventory comprising a supply and/or product is distributed across two or more geographic locations. In one embodiment, the inventory of a product includes supplies for manufacturing a product. In one embodiment, the methods and systems disclosed herein automatically track the number of items in an inventory of supplies and/or products. In one embodiment, the methods and systems disclosed herein prevent the inventory from reaching zero products. In one embodiment, a user operates the system or uses the methods disclosed herein to maintain a particular number of products within an inventory, e.g., a product not falling below a threshold limit, using historical data to maintain a set number of products, etc. In one embodiment, the methods and systems disclosed herein account for the time for moving a supply and/or product, e.g., ensuring a new collection of products arrives before an inventory is depleted.

As used herein, the term "collection of quotes from vendors" refers to an assortment of prices for services for obtaining a supply and/or product. In one embodiment, the collection of quotes from vendors comprises monetary values, e.g., price for a service, price for a supply and/or product, fees for customs, etc. In one embodiment, the collection of quotes from vendors comprises a non-monetary value, e.g., a reputational value (e.g., rating, review, or goodwill of a service), time of arrival, quality of a supply and/or product, ecological impact, etc. In one embodiment, the methods and systems disclosed herein constantly update the collection of quotes from vendors to provide the best pricing options from clients. In one embodiment, the methods and systems disclosed herein analyze historical data to curate specific quotes based on the client's preferences. In one embodiment, the methods and systems disclosed herein automatically solicit and request quotes from new vendors to recommend to a client.

As used herein, the term "automated alert mechanism" refers to a notification sent to a client and/or user. In one embodiment, the automated alert mechanism comprises a notification informing a client that an inventory of a product is at a particular number. In one embodiment, the automated alert mechanism comprises a message that the inventory is low and needs to be replenished. In one embodiment, the automated alert mechanism is presented on a Physical, Tangible Display Means, e.g., a screen, a computer, a mobile, etc. In one embodiment, the automated alert mechanism comprises a sound, e.g., a beep, a ringtone, a buzzer, etc. In one embodiment, the automated alert mechanism comprises a visual message, e.g., a text message, a popup, an email, a fax, a color based system, etc. In one embodiment, the automated alert mechanism comprises a tactical message, e.g., a vibration, a movement, etc. In one embodiment, the automated alert mechanism comprises a combination of a sound, visual message, and/or a tactile message.

Figure 2:
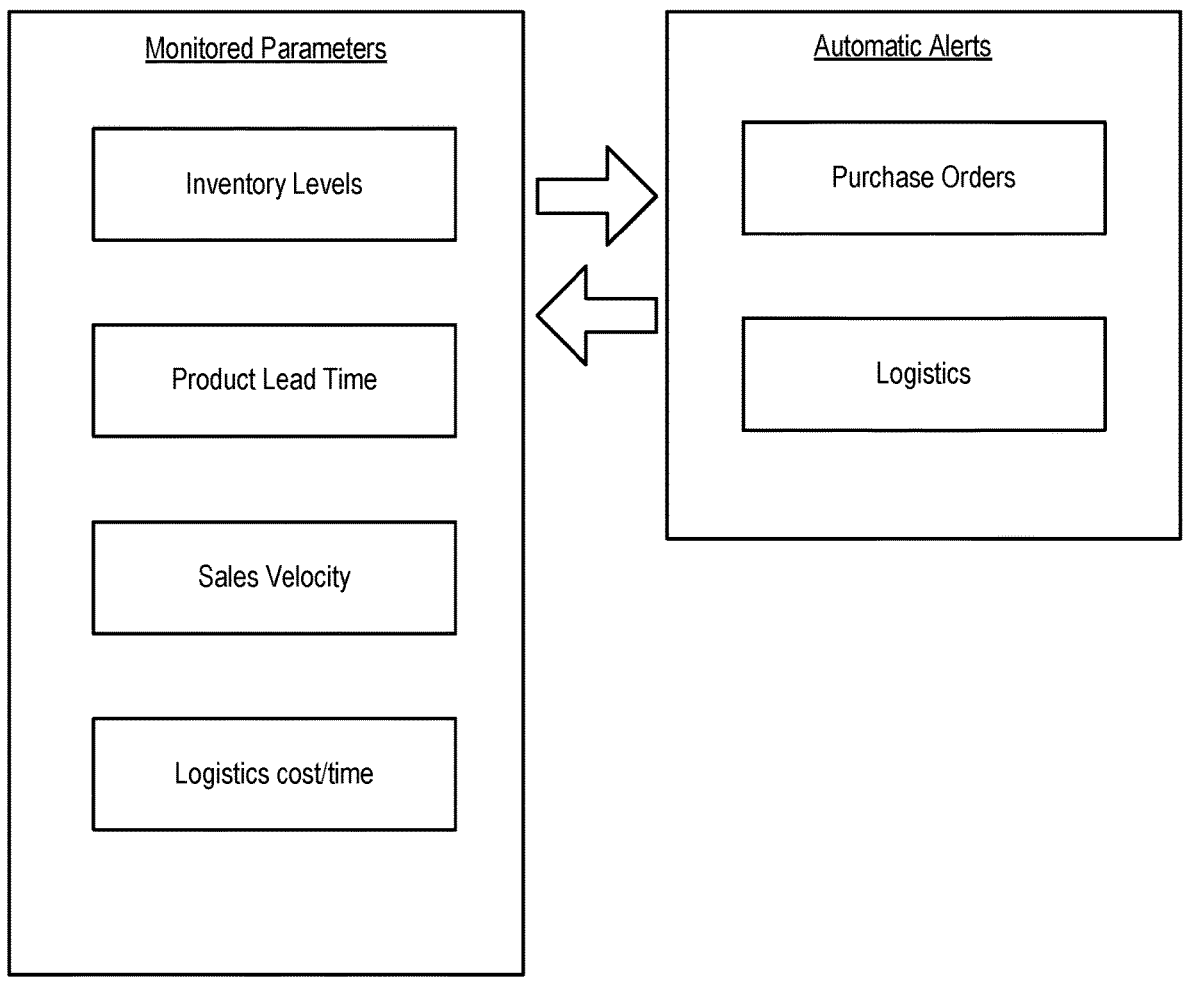
FIG. 2 is a diagram showing one illustrative example of monitoring and automating a supply chain with automatic alerts.

In one embodiment, the automated alert mechanism comprises an in-app alert. FIG. 2 is a diagram showing one example of monitoring and automating a supply chain with automatic alerts. Inventory levels are monitored across all network locations. The time it takes to create a product, the rate at which a product is selling, and the time it takes for products to be shipped are the parameters chosen. Based on these exemplary parameters, automatic alerts are presented within a graphical user interface, presenting when to order products, logistic costs, and routing options to a user.

In one embodiment, the methods and systems disclosed herein comprise a ship.

As used herein, the term "ship" refers to a seaworthy vessel traveling across water and is capable of moving mass. In one embodiment, the ship moves supplies and/or products from one location to another. In one embodiment, the methods and systems disclosed herein recommend a ship for the movement of a supply and/or product. In one embodiment, the methods and systems disclosed herein select a ship for the movement of a supply and/or product.

In one embodiment, the methods and systems disclosed herein comprise an airplane.

As used herein, the term "airplane" refers to a vessel traveling through the air and is capable of moving mass. In one embodiment, the airplane moves supplies and/or products from one location to another. In one embodiment, the methods and systems disclosed herein recommend an airplane for the movement of a supply and/or product. In one embodiment, the methods and systems disclosed herein select an airplane for the movement of a supply and/or product.

In one embodiment, the methods and systems disclosed herein comprise a truck.

As used herein, the term "truck" refers to a vessel traveling by ground and is capable of moving mass. In one embodiment, the truck moves supplies and/or products from one location to another. In one embodiment, the methods and systems disclosed herein recommend a truck for the movement of a supply and/or product. In one embodiment, the methods and systems disclosed herein select a truck for the movement of a supply and/or product.

In one embodiment, the methods and systems disclosed herein comprise a train.

As used herein, the term "train" refers to a vessel traveling by railroad tracks and is capable of moving mass. In one embodiment, the train moves supplies and/or products from one location to another. In one embodiment, the methods and systems disclosed herein recommend a train for the movement of a supply and/or product. In one embodiment, the methods and systems disclosed herein select a train for the movement of a supply and/or product.

In one embodiment, the methods and systems disclosed herein coordinate the movement of mass through a combination of ships, airplanes, truck, and/or train.

EXAMPLES

Example 1

Client sells and manufactures a Widget with Supply A, Supply B, and Supply C. Using the methods and systems disclosed herein, Client tracks the number of Widgets, Supply A, Supply B, and Supply C within Client's Inventory.

Client sets a threshold limit of 300 Widgets. When the threshold limit falls below 300 Widgets, the methods and systems disclosed herein replenish the number of Widgets of the Client's inventory to 1,000 Widgets.

When Client's inventory falls below 300 Widgets, the methods and systems disclosed herein evaluate the stock of Supply A, Supply B, and Supply C to manufacture Widgets. Supply B is below the amount needed while Supply A and Supply C are sufficient. The methods and systems disclosed herein determine where to source Supply B, calculate the best method to move Supply B, and when the Widgets will be created. Client is presented with multiple options and selects the desired option. Supply B is purchased and moved to Client's factory to manufacture Widget and restore Client's Inventory.

Example 2

Client sells Widget A, Widget B, and Widget C. Client sells the widgets in a single store located in California. All three widgets are sourced from different locations and sell at different rates. Using the methods and systems disclosed herein, Client determines the turnover rate for each of Widget A, Widget B, and Widget C. Client automates the methods and systems disclosed herein to ship Widget A, Widget B, and Widget C to his store when each widget falls below the threshold limit.

Although the present invention herein has been described with reference to various exemplary embodiments, it is to be understood that these embodiments are merely illustrative of the principles and applications of the present invention. Those having skill in the art would recognize that various modifications to the exemplary embodiments may be made, without departing from the scope of the invention.

Moreover, it should be understood that various features and/or characteristics of differing embodiments herein may be combined with one another. It is therefore to be understood that numerous modifications may be made to the illustrative embodiments and that other arrangements may be devised without departing from the scope of the invention.

Furthermore, other embodiments of the invention will be apparent to those skilled in the art from consideration of the specification and practice of the invention disclosed herein. It is intended that the specification and examples be considered as exemplary only, with a scope and spirit being indicated by the claims.

Finally, it is noted that, as used in this specification and the appended claims, the singular forms "a," "an," and "the," include plural referents unless expressly and unequivocally limited to one referent, and vice versa. As used herein, the term "include" or "comprising" and its grammatical variants are intended to be non-limiting, such that recitation of an item or items is not to the exclusion of other like items that can be substituted or added to the recited item(s).

What is claimed is:

1. A computer-implemented method comprising:
monitoring, by a computing device, inventory data that comprises product data for a plurality of products in an entity's physical possession;
wherein said monitoring comprises:
based on the product data of the inventory data, determining, by the computing device, real-time product data for a particular product of the plurality of products, the real-time product data comprising an estimated number of the particular product physically possessed by the entity at a particular time, and
determining, by the computing device, a turnover rate for the particular product, the turnover rate comprising a rate at which items enter and leave physical possession of the entity;
based, at least in part, on said monitoring, determining, by the computing device, to generate a purchase order for the particular product;
responsive to determining to generate a purchase order for the particular product:
calculating, by the computing device, a plurality of composite scores that comprises a composite score for each supply chain of a plurality of supply chains;
wherein each supply chain, of the plurality of supply chains, represents transportation of the particular product from a source location to a destination location;
wherein the composite score for each supply chain, of the plurality of supply chains, includes a plurality of components comprising:
a price-based value comprising one or more of: a total price for said each supply chain, or a unit price for said each supply chain;
a time-based value comprising one or more of: a duration for said each supply chain, or a time of arrival for said each supply chain; and
one or more of: a rating for said each supply chain, a review for said each supply chain, goodwill of a service for said each supply chain, product quality for said each supply chain, or ecological impact of said each supply chain; and selecting a supply chain of the plurality of supply chains, wherein the selected supply chain is associated with a particular freight service provider;

generating, by the computing device, a particular purchase order for the particular product based on the selected supply chain; and sending the particular purchase order to the particular freight service provider.

2. A system comprising one or more processors and main memory comprising one or more sequences of instructions that, when executed by the one or more processors, cause:

monitoring, by a computing device, inventory data that comprises product data for a plurality of products in an entity's physical possession;

wherein said monitoring comprises:

based on the product data of the inventory data, determining, by the computing device, real-time product data for a particular product of the plurality of products, the real-time product data comprising an estimated number of the particular product physically possessed by the entity at a particular time, and determining, by the computing device, a turnover rate for the particular product, the turnover rate comprising a rate at which items enter and leave physical possession of the entity;

based, at least in part, on said monitoring, determining, by the computing device, to generate a purchase order for the particular product;

responsive to determining to generate a purchase order for the particular product:

calculating, by the computing device, a plurality of composite scores that comprises a composite score for each supply chain of a plurality of supply chains;

wherein each supply chain, of the plurality of supply chains, represents transportation of the particular product from a source location to a destination location;

wherein the composite score for each supply chain, of the plurality of supply chains, includes a plurality of components comprising:

a price-based value comprising one or more of: a total price for said each supply chain, or a unit price for said each supply chain;

a time-based value comprising one or more of: a duration for said each supply chain, or a time of arrival for said each supply chain; and one or more of: a rating for said each supply chain, a review for said each supply chain, goodwill of a service for said each supply chain, product quality for said each supply chain, or ecological impact of said each supply chain; and selecting a supply chain of the plurality of supply chains, wherein the selected supply chain is associated with a particular freight service provider;

generating, by the computing device, a particular purchase order for the particular product based on the selected supply chain; and sending the particular purchase order to the particular freight service provider.

3. The system of claim 2, wherein each of the executed instructions are performed automatically by the computing device without input from a user.

4. The method of claim 1, wherein said selecting the supply chain is performed by the computing device.

5. The method of claim 1, further comprising:

the computing device generating a graphical user interface and causing the graphical user interface to be displayed at a display device communicatively coupled to the computing device;

wherein generating the graphical user interface comprises displaying, in the graphical user interface, two or more components of each composite score of the plurality of composite scores for the plurality of supply chains;

wherein said selecting the supply chain is performed by a user via the graphical user interface.

6. The method of claim 5, wherein the two or more components displayed for each composite score, of the plurality of composite scores, comprises the price-based value and the time-based value.

7. The method of claim 5, further comprising:

receiving, via the graphical user interface, a client preference value; and based, at least in part, on the client preference value, selecting the plurality of supply chains, from a set of possible supply chains;

wherein the client preference value indicates client preference for one or more of:

a preferred supply for the particular product, a preferred method of shipping, a preferred source, a preferred price range, a preferred freight service, or a preferred comparison metric of a plurality of preferred comparison metrics comprising: cost-effectiveness, speed of delivery, service quality, product quality, and history of completion of service.

8. The method of claim 5, wherein said generating the graphical user interface comprises displaying, in the graphical user interface, for a particular supply chain of the plurality of supply chains, additional information comprising one or more of: a projected arrival time, a timeline, a map, display of movement of mass from one or more geographic locations, or a logistics display.

9. The method of claim 8, further comprising including, in the graphical user interface, the additional information in response to user selection, via the graphical user interface, of the particular supply chain for review.

10. The method of claim 1, further comprising:

determining a client preference value; and based, at least in part, on the client preference value, selecting the plurality of supply chains, from a set of possible supply chains;

wherein said determining the client preference value comprises the computing device analyzing historical data to determine client preferences.

11. The method of claim 1, wherein said determining, by the computing device, to generate a purchase order for the particular product comprises identifying a date to generate the purchase order.

12. The method of claim 11, wherein said identifying the date to generate the purchase order is based, at least in part, on when a number of the particular product physically possessed by the entity is estimated to be low.

13. The method of claim 1, wherein at least one supply chain, of the plurality of supply chains, comprises multiple freight service providers.

14. The system of claim 2, wherein said selecting the supply chain is performed by the computing device.

15. The system of claim 2, wherein the one or more sequences of instructions further comprise instructions that, when executed by the one or more processors, cause:
- the computing device generating a graphical user interface and causing the graphical user interface to be displayed at a display device communicatively coupled to the computing device;
- wherein generating the graphical user interface comprises displaying, in the graphical user interface, two or more components of each composite score of the plurality of composite scores for the plurality of supply chains;
- wherein said selecting the supply chain is performed by a user via the graphical user interface.

16. The system of claim 15, wherein the two or more components displayed for each composite score, of the plurality of composite scores, comprises the price-based value and the time-based value.

17. The system of claim 15, wherein the one or more sequences of instructions further comprise instructions that, when executed by the one or more processors, cause:
- receiving, via the graphical user interface, a client preference value; and
- based, at least in part, on the client preference value, selecting the plurality of supply chains, from a set of possible supply chains;
- wherein the client preference value indicates client preference for one or more of:
  - a preferred supply for the particular product,
  - a preferred method of shipping,
  - a preferred source,
  - a preferred price range,
  - a preferred freight service, or
  - a preferred comparison metric of a plurality of preferred comparison metrics comprising: cost-effectiveness, speed of delivery, service quality, product quality, and history of completion of service.

18. The system of claim 15, wherein said generating the graphical user interface comprises displaying, in the graphical user interface, for a particular supply chain of the plurality of supply chains, additional information comprising one or more of: a projected arrival time, a timeline, a map, display of movement of mass from one or more geographic locations, or a logistics display.

19. The system of claim 18, wherein the one or more sequences of instructions further comprise instructions that, when executed by the one or more processors, cause including, in the graphical user interface, the additional information in response to user selection, via the graphical user interface, of the particular supply chain for review.

20. The system of claim 2, wherein the one or more sequences of instructions further comprise instructions that, when executed by the one or more processors, cause:
- determining a client preference value; and
- based, at least in part, on the client preference value, selecting the plurality of supply chains, from a set of possible supply chains;
- wherein said determining the client preference value comprises the computing device analyzing historical data to determine client preferences.

21. The system of claim 2, wherein said determining, by the computing device, to generate a purchase order for the particular product comprises identifying a date to generate the purchase order.

22. The system of claim 21, wherein said identifying the date to generate the purchase order is based, at least in part, on when a number of the particular product physically possessed by the entity is estimated to be low.

23. The system of claim 2, wherein at least one supply chain, of the plurality of supply chains, comprises multiple freight service providers.

* * * * *